United States Patent
Zheng et al.

(10) Patent No.: US 12,247,885 B2
(45) Date of Patent: Mar. 11, 2025

(54) METHOD AND DEVICE FOR DETECTING TEMPERATURE RISE INSIDE SUPERCONDUCTING LEVITATION DEVICE BASED ON DEEP LEARNING

(71) Applicant: SOUTHWEST JIAOTONG UNIVERSITY, Chengdu (CN)

(72) Inventors: Jun Zheng, Chengdu (CN); Peng Pang, Chengdu (CN); Zihan Wang, Chengdu (CN); Chenling Xian, Chengdu (CN); Boyi Zhao, Chengdu (CN)

(73) Assignee: SOUTHWEST JIAOTONG UNIVERSITY, Chengdu (CN)

( * ) Notice: Subject to any disclaimer, the term of this patent is extended or adjusted under 35 U.S.C. 154(b) by 0 days.

(21) Appl. No.: 18/754,630

(22) Filed: Jun. 26, 2024

(65) Prior Publication Data

US 2024/0344898 A1 Oct. 17, 2024

Related U.S. Application Data

(63) Continuation of application No. PCT/CN2024/083365, filed on Mar. 22, 2024.

(30) Foreign Application Priority Data

Jan. 10, 2024 (CN) .......................... 202410033606.9

(51) Int. Cl.
  *G01K 11/22* (2006.01)
  *G01K 13/00* (2021.01)
(52) U.S. Cl.
  CPC .............. *G01K 11/22* (2013.01); *G01K 13/00* (2013.01)

(58) Field of Classification Search
  CPC ............................ G01K 11/22; G01K 13/00
  See application file for complete search history.

(56) References Cited

U.S. PATENT DOCUMENTS

2022/0194829 A1 6/2022 Perrier et al.

FOREIGN PATENT DOCUMENTS

| CN | 104102838 A | 10/2014 |
| CN | 109033632 A | 12/2018 |

(Continued)

OTHER PUBLICATIONS

Ma, K. B., and et al. "Superconductor and magnet levitation devices." Review of scientific instruments 74, No. 12 (2003): 4989-5017 (Year: 2003).*

(Continued)

*Primary Examiner* — Douglas Kay

(57) ABSTRACT

A method for detecting temperature rise inside a superconducting levitation device based on deep learning is provided. An initial vibration acceleration information, an initial temperature rise information, and a vibration acceleration detection information are obtained. Feature extraction is performed on the initial vibration acceleration information to obtain a high-frequency feature parameter set and a low-frequency feature parameter set. Wavelet band energy calculation is performed for the high-frequency feature parameter set and the low-frequency feature parameter set to obtain a wavelet band energy information. The wavelet band energy information and the initial temperature rise information are input into a preset deep learning network for training to obtain an internal temperature rise detection model of the superconducting levitation device. The vibration acceleration detection information is input into the internal tempera- (Continued)

ture rise detection model to obtain an internal temperature rise prediction information to reflect real-time temperature rise of the superconductor.

8 Claims, 4 Drawing Sheets

(56) References Cited

FOREIGN PATENT DOCUMENTS

| CN | 111811682 A | | 10/2020 |
|---|---|---|---|
| CN | 111811683 A | | 10/2020 |
| CN | 113959566 A | | 1/2022 |
| CN | 114506221 A | | 5/2022 |
| CN | 114819105 A | | 7/2022 |
| CN | 114878162 A | | 8/2022 |
| CN | 114974790 A | | 8/2022 |
| CN | 116039393 A | * | 5/2023 |
| CN | 116047916 A | | 5/2023 |
| CN | 116106009 A | | 5/2023 |
| CN | 116519049 A | | 8/2023 |
| CN | 116629026 A | | 8/2023 |
| CN | 117007904 A | * | 11/2023 |
| CN | 117556704 A | * | 2/2024 |
| KR | 102238669 B1 | | 4/2021 |
| KR | 20230138276 A | | 10/2023 |
| KR | 102599139 B1 | | 11/2023 |
| WO | 2006118899 A1 | | 11/2006 |
| WO | 2020028313 A1 | | 2/2020 |
| WO | 2020095321 A2 | | 5/2020 |
| WO | 2021114231 A1 | | 6/2021 |
| WO | WO-2024092915 A1 | * | 5/2024 |

OTHER PUBLICATIONS

Ke, Zhihao, and et al. "Prediction models establishment and comparison for guiding force of high-temperature superconducting maglev based on deep learning algorithms." Superconductor Science and Technology 35, No. 2 (2022): 024005 (Year: 2022).*

Jun Zheng et al., "Vibration Characteristic of Magnetic Levitation System Using Bulk High-Tc Superconductor Magnet", Rare Metal Materials and Engineering, Oct. 2008, vol. 37, Suppl.4, pp. 261-265.

* cited by examiner

METHOD AND DEVICE FOR DETECTING TEMPERATURE RISE INSIDE SUPERCONDUCTING LEVITATION DEVICE BASED ON DEEP LEARNING

CROSS-REFERENCE TO RELATED APPLICATIONS

This application is a continuation of International Patent Application No. PCT/CN2024/083365, filed on Mar. 22, 2024, which claims the benefit of priority from Chinese Patent Application No. 202410033606.9, filed on Jan. 10, 2024. The content of the aforementioned application, including any intervening amendments made thereto, is incorporated herein by reference in its entirety.

TECHNICAL FIELD

This application relates to detection of temperature rise inside a superconducting levitation device, and more particularly to a method and device for detecting temperature rise inside a superconducting levitation device based on deep learning.

BACKGROUND

During the operation of high-temperature superconducting pinning magnetic levitation trains, factors, such as irregularities of the permanent magnet track, random demagnetization of the magnets, and train vibrations, will cause AC losses inside the superconductor, resulting in temperature rise. The temperature rise of the superconductor within the superconducting levitation device is a crucial parameter associated with the levitation performance of the levitation device. Therefore, during the operation of high-temperature superconducting pinning magnetic levitation trains, the real-time detection of the internal temperature rise of the superconductor is necessary to prevent the occurrence of quenching. Currently, the temperature rise of the superconductor inside the levitation device is detected mainly through the following procedures. The superconductor is drilled, and then temperature sensors are deployed to directly measure the temperature rise. However, this method will damage the structure of the superconductor, thereby impacting its levitation performance. Additionally, most of the existing temperature measurement methods employ platinum resistance sensors, which are sensitive to the magnetic field fluctuation, resulting in obvious measurement errors. Thus, there is an urgent need for a method to detect the internal temperature rise of the superconducting levitation device that does not affect the levitation performance and has high measurement accuracy.

SUMMARY

An object of this application is to provide a method and device for detecting temperature rise inside a superconducting levitation device based on deep learning to remedy the above problems.

The technical solutions of the present application will be described as follows.

In a first aspect, the present application provides a method for detecting temperature rise inside a superconducting levitation device based on deep learning, comprising:
obtaining an initial vibration acceleration information of the superconducting levitation device, an initial temperature rise information of a superconductor inside the superconducting levitation device, and a vibration acceleration detection information of the superconducting levitation device;
performing feature extraction on the initial vibration acceleration information to obtain a high-frequency feature parameter set and a low-frequency feature parameter set corresponding to the initial vibration acceleration information;
performing wavelet band energy calculation for the high-frequency feature parameter set and the low-frequency feature parameter set to obtain a wavelet band energy information;
inputting the wavelet band energy information and the initial temperature rise information to a preset deep learning network for training to obtain an internal temperature rise detection model of the superconducting levitation device; and
inputting the vibration acceleration detection information into the internal temperature rise detection model to obtain an internal temperature rise prediction information of the superconducting levitation device, wherein the internal temperature rise prediction information is configured to reflect real-time temperature rise of the superconductor.

In a second aspect, the present application provides a device for detecting temperature rise inside a superconducting levitation device based on deep learning, comprising:
an obtaining module;
a first processing module;
a second processing module;
a third processing module; and
a predicting module;
wherein the obtaining module is configured for obtaining an initial vibration acceleration information of the superconducting levitation device, an initial temperature rise information of a superconductor inside the superconducting levitation device, and a vibration acceleration detection information of the superconducting levitation device;
the first processing module is configured for performing feature extraction on the initial vibration acceleration information to obtain a high-frequency feature parameter set and a low-frequency feature parameter set corresponding to the initial vibration acceleration information;
the second processing module is configured for performing wavelet band energy calculation for the high-frequency feature parameter set and the low-frequency feature parameter set to obtain a wavelet band energy information;
the third processing module is configured for inputting the wavelet band energy information and the initial temperature rise information into a preset deep learning network for training to obtain an internal temperature rise detection model of the superconducting levitation device; and
the predicting module is configured for inputting the vibration acceleration detection information into the internal temperature rise detection model to obtain an internal temperature rise prediction information of the superconducting levitation device, wherein the internal temperature rise prediction information is configured to reflect real-time temperature rise of the superconductor.

The benefits of the present application are described as follows.

The present application introduces an internal temperature rise detection model of superconducting levitation devices based on deep learning. It employs the method of extracting the initial vibration acceleration information from the superconducting levitation device. By exploring the nonlinear mapping relationship between the temperature rise of the superconductor inside the superconducting levitation devices and the time-frequency domain characteristics of the vibration acceleration, a non-contact method for detecting the temperature rise inside the superconducting levitation device is proposed. This method does not affect the levitation performance of the superconductor. Moreover, with the incorporation of deep learning, it has the high accuracy of the internal temperature rise detection of the superconducting levitation device, avoids the need for temperature detection sensors, and eliminates the requirement for specific installation space for such sensors.

Other features and advantages of the present application will be described in the following specification and will become apparent, in part, from the specification or through the implementation of the embodiments of the present application. The objectives and other advantages of the present application can be realized and obtained by the structure particularly pointed out in the specification, claims, and accompanying drawings.

BRIEF DESCRIPTION OF THE DRAWINGS

In order to more clearly illustrate the technical solutions in the embodiments of the present application, the accompanying drawings needed in the description of the embodiments will be briefly described below. It should be understood that the following drawings only illustrate specific embodiments of the present application and should not be construed as limiting the scope of the application. For those skilled in the art, other related drawings can be obtained based on these drawings without making creative effort.

In the above figures, 1—obtaining module, 2—first processing module, 3—second processing module, 4—third processing module, 5—predicting module, 800—system for detecting temperature rise inside the superconducting levitation device, 801—processor, 802—memory, 803—multimedia component, 804—input/output interface, 805—communication component.

DETAILED DESCRIPTION OF EMBODIMENTS

To clarify the objectives, technical solutions, and advantages of the embodiments of the present application, the present application has been described in detail above with reference to accompanying drawings and embodiments. Obviously, described below are merely some, but not all, embodiments of the present application. The components of the embodiments of the present application described and illustrated in the accompanying drawings can generally be arranged and designed in various configurations. Therefore, the detailed description of the embodiments of the present application provided in the accompanying drawings is not intended to limit the scope of the claimed application but is merely representative of selected embodiments of the present application. Based on the embodiments provided herein, all other embodiments obtained by those skilled in the art without making creative efforts shall fall within the scope of the present application.

It should be noted that similar reference numbers and letters indicate similar items in the accompanying drawings. Therefore, once an item is defined in one drawing, it does not require further definition and explanation in subsequent drawings. Also, in the description of the present application, the terms "first," "second," etc., are used solely for distinguishing descriptions and should not be understood as indicating or implying relative importance.

Embodiment 1

This embodiment provides a method for detecting temperature rise inside a superconducting levitation device based on deep learning.

Figure 1:
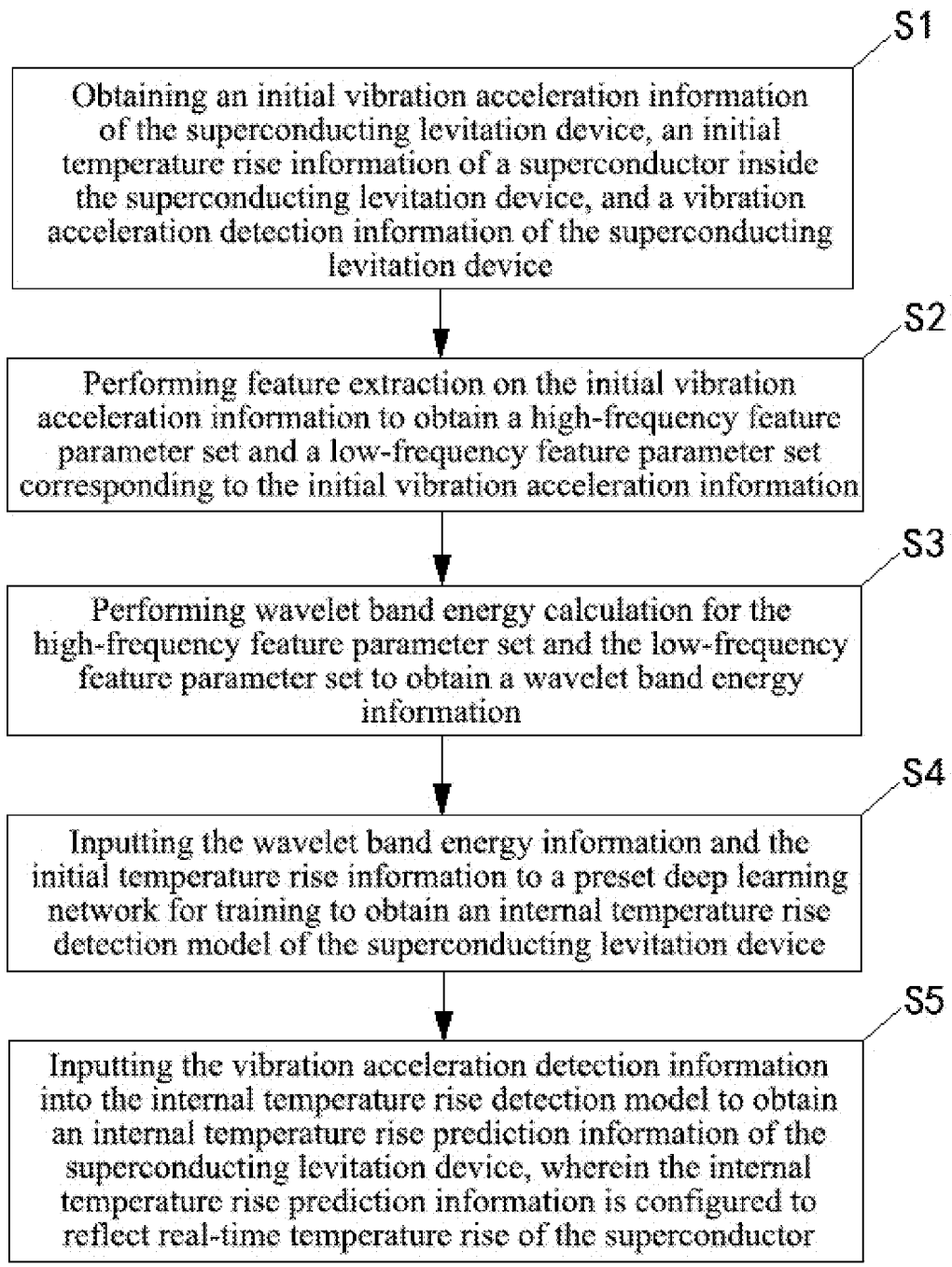
FIG. 1 is a flowchart of a method for detecting temperature rise inside a superconducting levitation device based on deep learning according to an embodiment of the present application.

As shown in FIG. 1, the method includes steps S1-S5.

(S1) An initial vibration acceleration information of the superconducting levitation device, an initial temperature rise information of a superconductor inside the superconducting levitation device, and a vibration acceleration detection information of the superconducting levitation device are obtained.

In the step (S1), both the initial vibration acceleration information and the vibration acceleration detection information of the superconducting levitation device can be collected using vibration acceleration sensors. Since the superconductor is a high-temperature superconducting material with a critical temperature below 93K, it can be cooled with liquid nitrogen. Once it is in a superconducting state, the pinning centers inside the superconductor can capture the magnetic flux lines above the permanent magnet track, thereby providing self-stabilization. The initial vibration acceleration information in this method is used to show the vibration acceleration values within the temperature range from liquid nitrogen temperature to the critical temperature at which superconductivity is lost. The vibration acceleration detection information of the superconducting levitation device is used to show the real-time vibration acceleration of the current superconducting levitation device.

The initial temperature rise information of the superconductor inside the superconducting levitation device is collected using a temperature sensor to facilitate data training at a later stage.

(S2) Feature extraction is performed on the initial vibration acceleration information to obtain a high-frequency feature parameter set and a low-frequency feature parameter set corresponding to the initial vibration acceleration information.

To clarify the specific process of feature extraction, S2 includes the following sub-steps S21-S23.

(S21) A scale factor and a translation factor of a wavelet transform are obtained.

(S22) The scale factor, the translation factor and the initial vibration acceleration information are decomposed through a preset wavelet decomposition model to obtain a plurality of decomposition feature parameters.

The wavelet decomposition model is represented by:

$$w_f(a, b) = \sqrt{a} \int_{-\infty}^{+\infty} f(t) \overline{\psi\left(\frac{t-b}{a}\right)} dt. \qquad (1)$$

In the formula (1), $w_f(a, b)$ represents a single decomposition feature parameter when the scale factor is a and the translation factor is b; f(t) represents the initial vibration acceleration information; $\overline{\psi}$ is a complex conjugate of $\psi$, $\psi$ represents a preset basic wavelet, and t is a time variable.

(S23) The plurality of decomposition feature parameters are sorted in sequence to obtain the high-frequency feature parameter set and the low-frequency feature parameter set.

To clarify the specific process of sorting the plurality of decomposition feature parameters, S23 includes the following sub-steps S231-S235.

(S231) The number of branches and the number of levels of a complete binary tree are obtained.

(S232) A first decomposition feature parameter among the plurality of decomposition feature parameters is configured as a heap top.

In the step (S22), the heap is used to express the decomposition feature parameters in the form of an array. Once the heap top is set, it facilitates the sequential insertion of the remaining decomposition feature parameters, allowing each decomposition feature parameter to be associated with a node position in the binary tree.

(S233) Remaining decomposition feature parameters among the plurality of decomposition feature parameters are sequentially inserted based on the number of branches and the number of levels to obtain an unsorted decomposition feature parameter heap.

In the step (S233), all the decomposition feature parameters are simply and correspondingly inserted to obtain the unsorted decomposition feature parameter heap.

(S234) The unsorted decomposition feature parameter heap is sorted based on a preset min-heap model to obtain a sorted decomposition feature parameter heap.

In S234, the preset min-heap model is as follows. The smallest element value in the min-heap is at the root node, meaning the smallest low-frequency feature parameter is at the heap top after sorting. The element value of each parent node in the heap is smaller than the element values of its child nodes.

During sorting, the existing heap sort algorithm can be used to obtain the sorted decomposition feature parameter heap.

(S235) The sorted decomposition feature parameter heap is divided based on a preset frequency threshold to obtain the high-frequency feature parameter set and the low-frequency feature parameter set.

In S235, the sorted decomposition feature parameter heap is divided according to a preset frequency threshold. If the element value corresponding to the feature parameter is greater than the preset frequency threshold, it is saved in the high-frequency feature parameter set; if the element value corresponding to the feature parameter is less than the preset frequency threshold, it is saved in the low-frequency feature parameter set.

(S3) Wavelet band energy calculation for the high-frequency feature parameter set and the low-frequency feature parameter set is performed to obtain a wavelet band energy information.

In the step (S3), the specific process of wavelet band energy calculation includes sub-steps S31-S35.

(S31) A first preset wavelet basis function is solved to obtain a plurality of first wavelet basis points respectively corresponding to a plurality of high-frequency feature parameters in the high-frequency feature parameter set.

In S31, the wavelet basis function is an existing method, which aims to decompose each input high-frequency feature parameter into the corresponding wavelet basis point coordinates.

(S32) A high-frequency band energy set is obtained based on the plurality of first wavelet basis points through the following formula:

$$E_H = \{b_1^2 + b_2^2 + \ldots + b_r^2\}. \qquad (2)$$

In the formula (2), EH is the high-frequency band energy set, and $\{b_1, b_2, \ldots, b_r\}$ respectively represent the plurality of first wavelet basis points.

(S33) A second preset wavelet basis function is solved to obtain a plurality of second wavelet basis points respectively corresponding to a plurality of low-frequency feature parameters in the low-frequency feature parameter set.

In S33, the wavelet basis function is also an existing method, which aims to decompose each input low-frequency feature parameter into the corresponding wavelet basis point coordinates.

(S34) A low-frequency band energy set is obtained based on the plurality of second wavelet basis points through the following formula:

$$E_L = \{a_1^2 + a_2^2 + \ldots + a_s^2\}. \qquad (3)$$

In the formula (3), $E_L$ is the low-frequency band energy set, and $\{a_1, a_2, \ldots, a_s\}$ respectively represent the plurality of second wavelet basis points.

(S35): The high-frequency band energy set and the low-frequency band energy set are solved using a preset normalization model to obtain the wavelet band energy information.

The preset normalization model is represented by:

$$A_n = \frac{E_n^2}{E_L + E_H}. \qquad (4)$$

In the formula (4), $A_n$ is a wavelet band energy information corresponding to n feature parameters, and $E_n^2$ is a band energy corresponding to n feature parameters.

(S4) The wavelet band energy information and the initial temperature rise information are input to a preset deep learning network for training to obtain an internal temperature rise detection model of the superconducting levitation device.

Figure 4:
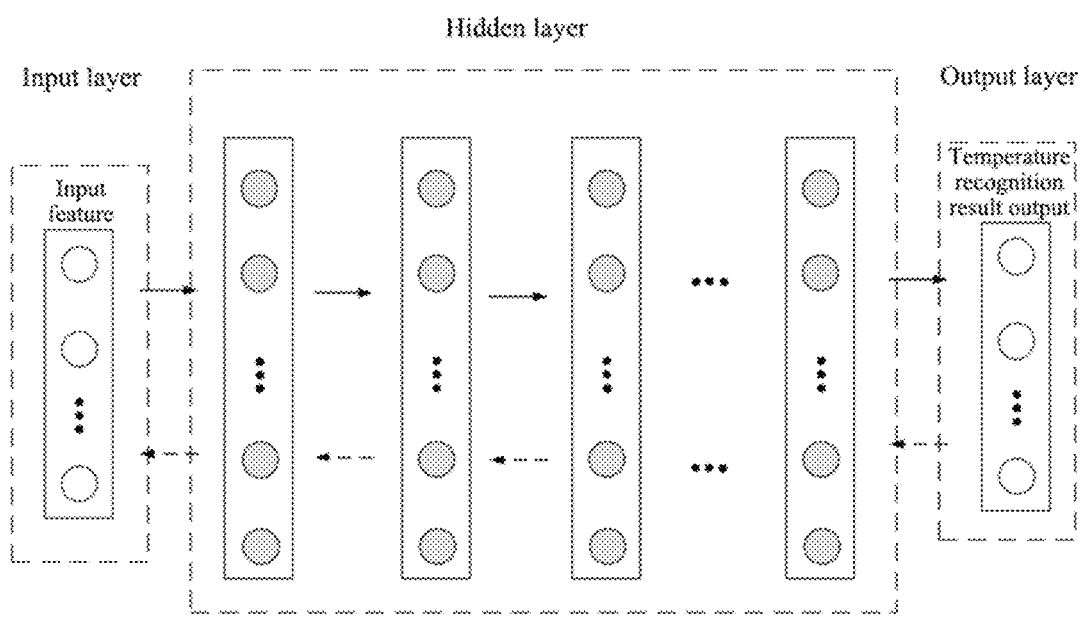
FIG. 4 is a schematic diagram of the structure of an internal temperature rise detection model of the superconducting levitation device.

As shown in FIG. 4, the preset deep learning network in the step (S4) is an error back propagation neural network. S4 includes the following sub-steps S41-S44.

(S41) The number of neurons of an input layer, the number of neurons of a hidden layer, and the number of neurons of an output layer are obtained.

(S42) An output information of the neurons of the hidden layer is obtained based on the number of the neurons of the input layer and the number of the neurons of the hidden layer using a preset hidden-layer output model.

In S42, the preset hidden-layer output model is represented by:

$$x_j^h = \sigma^h\left(\sum_{i=1}^{m} w_{ij}^h x_i + b_j^h\right)(j = 1, 2, \ldots, q). \quad (5)$$

In the formula (5), $x_j^h$ is an output information of a j-th neuron of the hidden layer, $\sigma^h$ is an activation function of the neurons of the hidden layer, m is the number of the neurons of the input layer, q is the number of the neurons of the hidden layer, $w_{ij}^h$ is a connection weight between an i-th neuron of the input layer and the j-th neuron of the hidden layer, $x_i$ is the i-th neuron of the input layer, and $b_j^h$ is a bias of the j-th neuron of the hidden layer.

(S43) An output information of the neurons of the output layer is obtained based on the number of the neurons of the hidden layer and the number of the neurons of the output layer using a preset output-layer output model.

In the S43, the output-layer output model is represented by:

$$\begin{cases} y_k = \sigma^0\left(\sum_{j=1}^{q} w_{jk}^0 x_j^k + b_k^0\right)(j = 1, 2, \ldots, q) \\ y^A = \{y_k^A \mid k = 1, 2, \ldots, n\} \end{cases} \quad (6)$$

In the formula (6), $y_k$ is an output information of a k-th neuron of the output layer, $\sigma^0$ is an activation function of the neurons of the output layer, j represents a range of the number of the neurons of the hidden layer, q is the number of the neurons of the hidden layer, k represents a range of the number of the neurons of the output layer, n is the number of the neurons of the output layer, $w_{jk}^0$ is a connection weight between a j-th neuron of the hidden layer and the k-th neuron of the output layer, $x_j^h$ is an output information of the j-th neuron of the hidden layer, be is a bias of the k-th neuron of the output layer, $y^A$ is an output information of the neurons of the output layer, and $y_k^A$ is an output information of the k-th neuron of the output layer.

In this method, the training parameters of the error back propagation neural network are listed as follows: the number of the neurons of the hidden layer is 5, the number of the neurons of the input layer is 5, a learning rate coefficient is 0.001, a training frequency is 1000, and a minimum error of a training objective is $10^{-6}$.

In this method, to overcome the poor generalization ability and robustness of the error back propagation neural network, the preset deep learning network consists of multiple error back propagation neural networks, including steps S44 to S46.

(S44) Each of the error back propagation neural networks is trained to obtain the prediction error information.

In S44, the prediction error information is represented by:

$$e_f = \sum_l D(l) \quad l = 2, \ldots, M. \quad (7)$$

In the above formula (7), $e_f$ is the prediction error information, D(I) represents the output error of the output information of the l-th error back propagation neural network, l ranges from 2 to M.

(S45) The calculation of prediction error information is performed using a preset weight prediction model to obtain the predicted sequence weight information corresponding to the prediction error information.

In S45, the weight prediction model is represented by:

$$\alpha_g = \frac{1}{2}\ln\left(\frac{1 - e_f}{e_f}\right). \quad (8)$$

In the formula (8), ag is the predicted sequence weight information corresponding to the prediction error information, $e_f$ is the prediction error information.

(S46) A strong classification model in the internal temperature rise detection model of the superconducting levitation device is constructed based on a plurality of error back propagation neural networks and the predicted sequence weight information. The strong classification model is used for supplementary prediction.

In step (S46), the formula of the strong classification model is:

$$h(y) = \text{sign}\left\{\sum_{z=1}^{T} \alpha_g \cdot f[V(z), \alpha_g]\right\}. \quad (9)$$

In the formula (9), h(y) represents the output information after the strong classification model is used for supplementary prediction, z is the number of training iterations, with its range being 1 to T, $\alpha_g$ is the predicted sequence weight information corresponding to the prediction error information, $f[V(z), \alpha_g]$ represents the preset training function of the error back propagation neural network in each training iteration.

(S5) The vibration acceleration detection information is input into the internal temperature rise detection model to obtain an internal temperature rise prediction information of the superconducting levitation device, the internal temperature rise prediction information is configured to reflect real-time temperature rise of the superconductor.

As the internal temperature rise detection model of the superconducting levitation device can reflect the nonlinear mapping relationship between the temperature rise of the superconductor inside the superconducting levitation device and the time-frequency domain characteristics of the vibration acceleration. When the vibration acceleration detection information of the superconducting levitation device is obtained, it can be inputted into the detection model to obtain the predicted internal temperature rise information of the superconducting levitation device. This method is a non-contact internal temperature rise detection method for superconducting levitation devices, which does not affect the levitation performance of the superconductor. Furthermore, based on deep learning, it can ensure the accuracy of detecting the temperature rise of the superconductor inside the superconducting levitation device, avoiding the need for temperature detection sensors and eliminating the requirement for specific installation space for temperature detection sensors.

Embodiment 2

Figure 2:
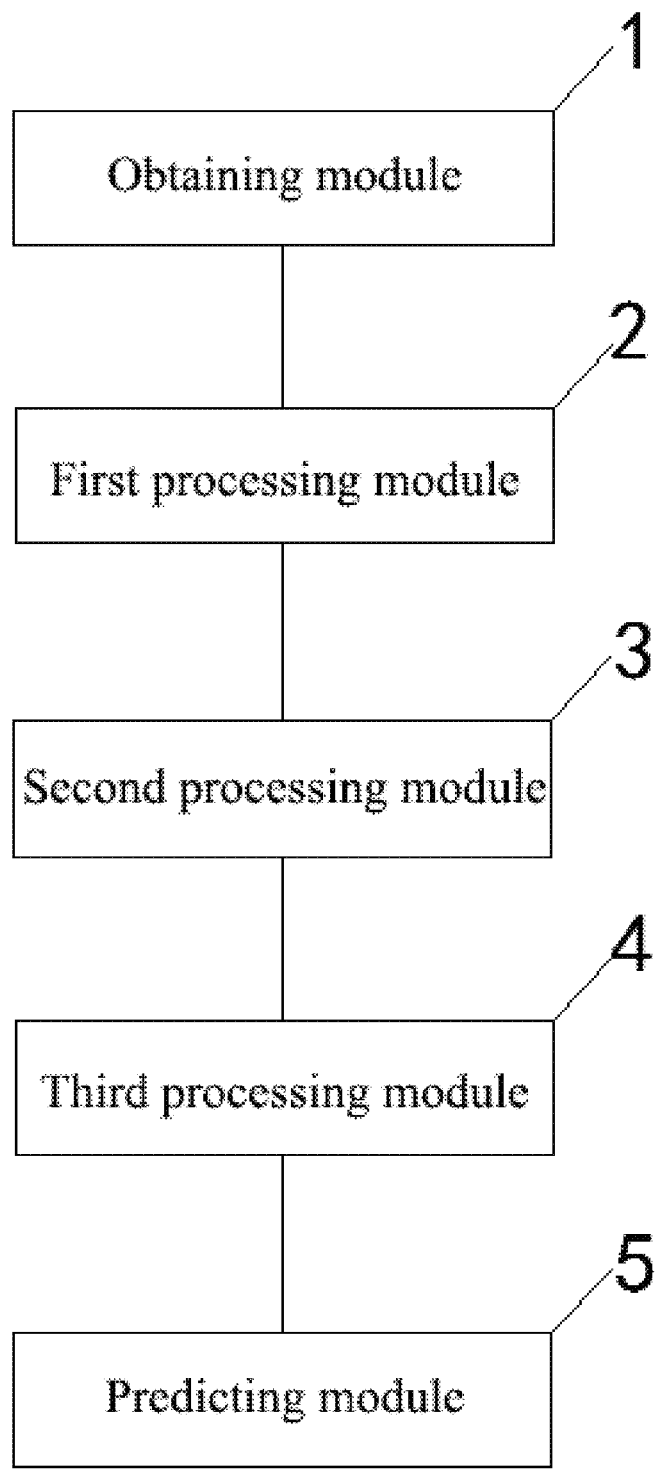
FIG. 2 is a schematic diagram of the structure of a device for detecting temperature rise inside the superconducting levitation device based on deep learning according to an embodiment of the present application.

As shown in FIG. 2, this embodiment provides a device for detecting temperature rise inside a superconducting levitation device based on deep learning. This device includes the following modules.

The obtaining module 1 is configured for obtaining an initial vibration acceleration information of the superconducting levitation device, an initial temperature rise information of a superconductor inside the superconducting levitation device, and a vibration acceleration detection information of the superconducting levitation device.

The first processing module 2 is configured for performing feature extraction on the initial vibration acceleration information to obtain a high-frequency feature parameter set and a low-frequency feature parameter set corresponding to the initial vibration acceleration information.

The second processing module 3 is configured for performing wavelet band energy calculation for the high-frequency feature parameter set and the low-frequency feature parameter set to obtain a wavelet band energy information.

The third processing module 4 is configured for inputting the wavelet band energy information and the initial temperature rise information into a preset deep learning network for training to obtain an internal temperature rise detection model of the superconducting levitation device.

The predicting module 5 is configured for inputting the vibration acceleration detection information into the internal temperature rise detection model to obtain an internal temperature rise prediction information of the superconducting levitation device, wherein the internal temperature rise prediction information is configured to reflect real-time temperature rise of the superconductor.

It should be noted that, regarding the device in the above embodiment, the specific manner in which individual modules are operated has been described in detail in the relevant embodiments of the method. Therefore, detailed explanations will not be provided here.

Embodiment 3

In correspondence to the method embodiments mentioned above, this embodiment also provides a system for detecting temperature rise inside a superconducting levitation device based on deep learning. The following description of the system for detecting temperature rise inside the superconducting levitation device based on deep learning and the method for detecting temperature rise inside the superconducting levitation device based on deep learning described above can be mutually referenced accordingly.

Figure 3:
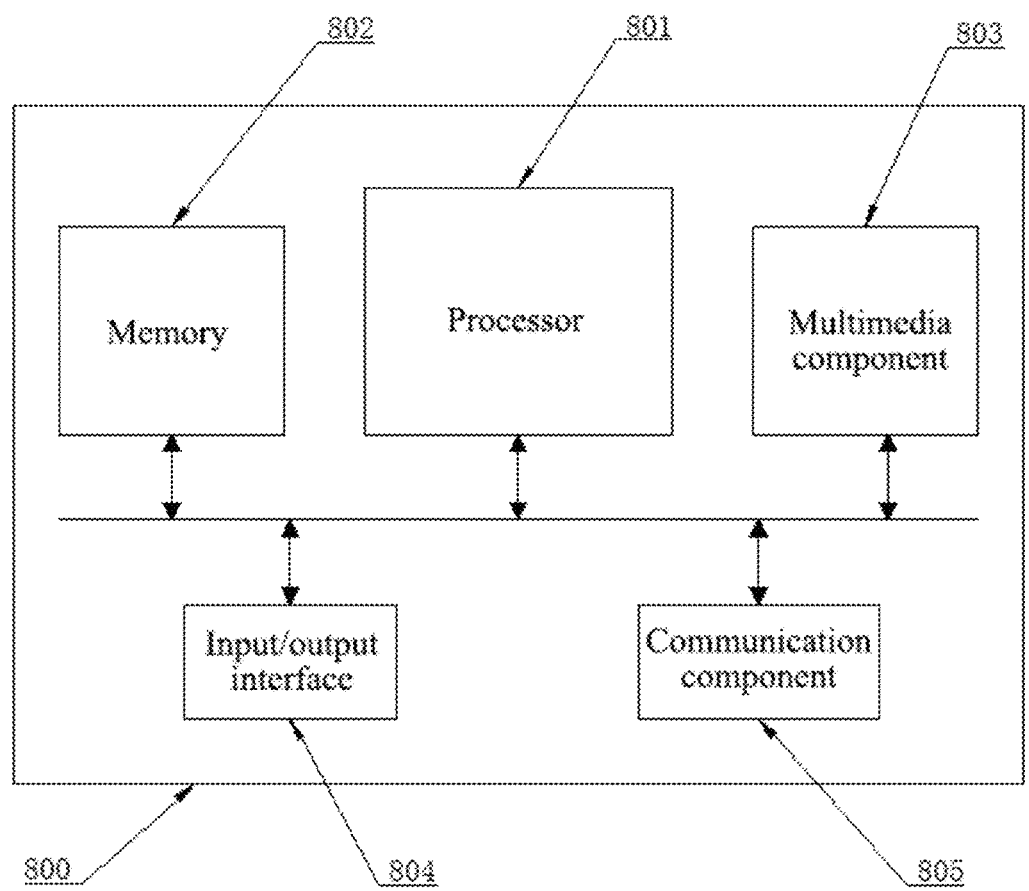
FIG. 3 is a schematic diagram of the structure of a system for detecting temperature rise inside the superconducting levitation device based on deep learning according to an embodiment of the present application.

FIG. 3 depicts a block diagram of the system for detecting temperature rise inside the superconducting levitation device based on deep learning 800 according to an exemplary embodiment. The system 800 may include a processor 801, a memory 802. The system 800 may further include one or more of a multimedia component 803, an I/O interface 804, and a communication component 805.

The processor 801 is configured for controlling the overall operation of the system for detecting temperature rise inside the superconducting levitation device based on deep learning 800, so as to complete all or part of the steps of the method for detecting temperature rise inside the superconducting levitation device based on deep learning described above. The memory 802 is configured for storing various types of data to support the operation of the system for detecting temperature rise inside the superconducting levitation device based on deep learning 800. The data may include instructions for any applications or methods operating on the system for detecting temperature rise inside the superconducting levitation device based on deep learning 800, as well as application-related data such as contact data, messages sent and received, images, audio, video, etc. The memory 802 may be implemented by any type of volatile or non-volatile storage device or their combination, such as Static Random Access Memory (SRAM), Electrically Erasable Programmable Read-Only Memory (EEPROM), Erasable Programmable Read-Only Memory (EPROM), Programmable Read-Only Memory (PROM), Read-Only Memory (ROM), magnetic storage, flash memory, disks, or optical discs. The multimedia component 803 may include a screen and an audio component. The screen, for example, can be a touchscreen, and the audio component is used to output and/or input audio signals. For example, the audio component may include a microphone for receiving external audio signals. The received audio signals can be further stored in the memory 802 or sent via the communication component 805. The audio component also includes at least one speaker for outputting audio signals. The I/O interface 804 provides an interface between the processor 801 and other interface modules, which can be a keyboard, mouse, buttons, etc. These buttons can be virtual or physical. The communication component 805 is configured for wired or wireless communication between the system for detecting temperature rise inside the superconducting levitation device based on deep learning 800 and other devices. For wireless communication, such as Wi-Fi, Bluetooth, Near Field Communication (NFC), 2G, 3G, or 4G, or a combination thereof, the corresponding communication component 805 may include a Wi-Fi module, Bluetooth module, and NFC module.

In an illustrative embodiment, the system for detecting temperature rise inside the superconducting levitation device based on deep learning 800 can be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors, or other electronic components to perform the above method for detecting temperature rise inside the superconducting levitation device based on deep learning.

In another embodiment, a non-transitory computer-readable storage medium including program instructions is provided. The above temperature rise detection method can be implemented when the program instruction is executed by a processor. For example, the non-transitory computer-readable storage medium may be the above-mentioned memory 802 including program instructions, which can be executed by the processor 801 of the system 800 to perform the above-mentioned temperature rise detection method.

Embodiment 4

This embodiment provides a non-transitory computer-readable storage medium corresponding to the method mentioned above. The computer-readable storage medium described below and the corresponding detection method described above can be mutually referenced accordingly.

The non-transitory computer-readable storage medium stores a computer program. The method described above for detecting temperature rise inside the superconducting levitation device can be implemented when the computer program is executed by a processor.

Specific examples of the readable storage medium include USB drives, external hard drives, Read-Only Memory (ROM), Random Access Memory (RAM), disks, or optical discs, and other various readable storage media capable of storing.

The above-described embodiments are only preferred embodiments of the present application and are not intended to limit the present application. For those skilled in the art, the present application may be modified and varied in various ways. Any modifications, equivalent substitutions, improvements, etc., made within the spirit and principle of the present application shall fall within the scope of the present disclosure defined by the appended claims.

The present disclosure has been described in detail above with reference to several embodiments, but is not limited thereto. It should be noted that for those skilled in the art, various modifications and improvements can still be made to the technical features recited in the above embodiments. It should be understood that those modifications and improvements made without departing from the scope of the present disclosure shall fall within the scope of the present disclosure defined by the appended claims.

What is claimed is:

1. An application specific integrated circuit (ASIC) for a preset deep learning network, the ASIC comprising:
a processor including a plurality of neurons, wherein each neuron comprises a microprocessor;
a memory for storing a program, when executed by the processor, to perform a method for detecting temperature rise inside a superconducting levitation device based on deep learning;
a multimedia component;
an I/O interface; and
a communication component configured for wired or wireless communication in the ASIC;
wherein the method for detecting temperature rise inside a superconducting levitation device based on deep learning comprises:
a) collecting, by a vibration acceleration sensor, an initial vibration acceleration information and a vibration acceleration detection information of the superconducting levitation device, and collecting, by a temperature sensor, an initial temperature rise information of a superconductor provided in the superconducting levitation device;
b) extracting, by the processor, features from the initial vibration acceleration information to obtain a high-frequency feature parameter set and a low-frequency feature parameter set, comprising:
obtaining a scale factor and a translation factor of a wavelet transform;
generating a plurality of decomposition feature parameters based on the scale factor, the translation factor and the initial vibration acceleration information through a preset wavelet decomposition model, wherein the preset wavelet decomposition model is represented by:

$$w_f(a, b) = \sqrt{a} \int_{-\infty}^{+\infty} f(t) \overline{\psi\left(\frac{t-b}{a}\right)} dt;$$

wherein $w_f(a, b)$ represents a single decomposition feature parameter, a is the scale factor, b is the translation factor, f(t) represents the initial vibration acceleration information, $\overline{\psi}$ is a complex conjugate of $\psi$, $\psi$ represents a preset basic wavelet, and t is a time variable; and
sorting the plurality of decomposition feature parameters in sequence to obtain the high-frequency feature parameter set and the low-frequency feature parameter set by:
obtaining a number of branches and a number of levels of a complete binary tree constructed from the plurality of decomposition feature parameters;
configuring a first decomposition feature parameter among the plurality of decomposition feature parameters as a heap top;
inserting remaining decomposition feature parameters among the plurality of decomposition feature parameters sequentially based on the number of branches and the number of levels to obtain an unsorted decomposition feature parameter heap;
sorting the unsorted decomposition feature parameter heap based on a preset min-heap model to obtain a sorted decomposition feature parameter heap; and
dividing the sorted decomposition feature parameter heap based on a preset frequency threshold to obtain the high-frequency feature parameter set and the low-frequency feature parameter set;
c) generating, by the processor, a wavelet band energy information using the high-frequency feature parameter set and the low-frequency feature parameter set by:
creating a plurality of first wavelet basis points respectively corresponding to a plurality of high-frequency feature parameters in the high-frequency feature parameter set using a first preset wavelet basis function;
obtaining a high-frequency band energy set based on the plurality of first wavelet basis points through the following formula:

$$E_H = \{b_1^2 + b_2^2 + \ldots + b_r^2\};$$

wherein $E_H$ is the high-frequency band energy set, and $\{b_1, b_2, \ldots, b_r\}$ represent the plurality of first wavelet basis points, respectively, and b is an integer greater than 2;
creating a plurality of second wavelet basis points respectively corresponding to a plurality of low-frequency feature parameters in the low-frequency feature parameter set using a second preset wavelet basis function;
obtaining a low-frequency band energy set based on the plurality of second wavelet basis points through the following formula:

$$E_L = \{a_1^2 + a_2^2 + \ldots + a_s^2\};$$

wherein $E_L$ is the low-frequency band energy set, and $\{a_1, a_2, \ldots, a_s\}$ respectively represent the plurality of second wavelet basis points, and s is an integer greater than 2; and
generating the wavelet band energy information based on the high-frequency band energy set and the low-frequency band energy set using a preset normalization model, wherein the preset normalization model is represented by:

$$A_n = \frac{E_n^2}{E_L + E_H};$$

wherein $A_n$ is the wavelet band energy information corresponding to n feature parameters, and $E_n^2$ is a band energy corresponding to n feature parameters;

d) training, by the processor, the preset deep learning network based on the wavelet band energy information and the initial temperature rise information to generate an internal temperature rise detection model of the superconducting levitation device, wherein the preset deep learning network consists of multiple error back propagation neural networks, the training comprising:
training each of the error back propagation neural networks error back propagation neural networks to obtain prediction error information;
producing a predicted sequence weight information corresponding to the prediction error information using a preset weight prediction model; and
constructing a classification model in the internal temperature rise detection model of the superconducting levitation device based on the error back propagation neural networks and the predicted sequence weight information; and e) generating, by the processor, an internal temperature rise prediction information of the superconducting levitation device using the internal temperature rise detection model based on the vibration acceleration detection information, wherein the internal temperature rise prediction information shows a real-time temperature rise of the superconductor.

2. The ASIC of claim 1, wherein the prediction error information is represented by:

$$e_f = \Sigma_l D(l) \ l = 2, \ldots, M,$$

wherein $e_f$ is the prediction error information, D(l) represents an output error of an output information of l-th error back propagation neural network, M is an integer greater than 2.

3. The ASIC of claim 2, wherein the weight prediction model is represented by:

$$\alpha_g = \frac{1}{2} \ln\left(\frac{1 - e_f}{e_f}\right),$$

wherein $\alpha_g$ is the predicted sequence weight information corresponding to the prediction error information.

4. The ASIC of claim 2, wherein the classification model is represented by:

$$h(y) = \text{sign}\{\Sigma_{z=1}^{T} \alpha_g \cdot f[V(z), \alpha_g]\},$$

wherein h(y) represents the output information when the classification model is used for supplementary prediction, z is a number of training iterations ranging from 1 to T, T is an integer greater than 1, $\alpha_g$ is the predicted sequence weight information corresponding to the prediction error information, $f[V(z), \alpha_g]$ represents a preset training function of each of the error back propagation neural networks in each of the training iterations.

5. The ASIC of claim 1, wherein step d) further comprises:

obtaining, among the plurality of neurons, a number of neurons of an input layer, a number of neurons of a hidden layer, and a number of neurons of an output layer;
obtaining an output information of the neurons of the hidden layer based on the number of the neurons of the input layer and the number of the neurons of the hidden layer using a preset hidden-layer output model; and
obtaining an output information of the neurons of the output layer based on the number of the neurons of the hidden layer and the number of the neurons of the output layer using a preset output-layer output model.

6. The ASIC of claim 5, wherein the preset hidden-layer output model is represented by:

$$x_j^h = \sigma^h\left(\sum_{i=1}^{m} w_{ij}^h x_i + b_j^h\right) \ (j = 1, 2, \ldots, q);$$

wherein $x_j^h$ is an output information of a j-th neuron of the hidden layer, $\sigma^h$ is an activation function of the neurons of the hidden layer, m is the number of the neurons of the input layer, q is the number of the neurons of the hidden layer, $w_{ij}^h$ is a connection weight between an i-th neuron of the input layer and the j-th neuron of the hidden layer, $x_i$ is the i-th neuron of the input layer, and $b_j^h$ is a bias of the j-th neuron of the hidden layer.

7. The ASIC of claim 5, wherein the output-layer output model is represented by:

$$\begin{cases} y_k = \sigma^0\left(\sum_{j=1}^{q} w_{jk}^0 x_j^h + b_k^0\right) \ (j = 1, 2, \ldots, q) \\ y^A = \{y_k^A \mid k = 1, 2, \ldots, n\} \end{cases};$$

wherein $y_k$ is an output information of a k-th neuron of the output layer, $\sigma^0$ is an activation function of the neurons of the output layer, j represents a range of the number of the neurons of the hidden layer, q is the number of the neurons of the hidden layer, k represents a range of the number of the neurons of the output layer, n is the number of the neurons of the output layer, $w_{jk}^0$ is a connection weight between a j-th neuron of the hidden layer and the k-th neuron of the output layer, $x_j^h$ is an output information of the j-th neuron of the hidden layer, $b_k^0$ is a bias of the k-th neuron of the output layer, $y^A$ is an output information of the neurons of the output layer, n is an integer greater than 2, and $y_k^A$ is an output information of the k-th neuron of the output layer.

8. The ASIC of claim 5, wherein training parameters of the error back propagation neural network are listed as follows:
the number of the neurons of the hidden layer is 5;
the number of the neurons of the input layer is 5;
a learning rate coefficient is 0.001;
a training frequency is 1000; and
a minimum error of a training objective is $10^{-6}$.

* * * * *